(12) United States Patent
Clemm et al.

(10) Patent No.: US 8,150,018 B2
(45) Date of Patent: Apr. 3, 2012

(54) SYSTEM AND METHOD FOR PROVISIONING CONNECTIONS AS A DISTRIBUTED DIGITAL CROSS-CONNECT OVER A PACKET NETWORK

(75) Inventors: L. Alexander Clemm, Los Gatos, CA (US); Dieter W. Famula, Colorado Springs, CO (US)

(73) Assignee: Cisco Technology, Inc., San Jose, CA (US)

( * ) Notice: Subject to any disclaimer, the term of this patent is extended or adjusted under 35 U.S.C. 154(b) by 1680 days.

(21) Appl. No.: 10/323,191

(22) Filed: Dec. 18, 2002

(65) Prior Publication Data

US 2004/0120318 A1 Jun. 24, 2004

(51) Int. Cl.
*H04M 7/00* (2006.01)
*H04L 12/28* (2006.01)
*H04L 12/56* (2006.01)

(52) U.S. Cl. ............... 379/220.01; 370/395.2; 370/401

(58) Field of Classification Search .............. 370/352, 370/395.2, 401; 379/220.01
See application file for complete search history.

(56) References Cited

U.S. PATENT DOCUMENTS

| | | | |
|---|---|---|---|
| 5,935,209 A | 8/1999 | Budhraja et al. | 709/223 |
| 6,173,324 B1 * | 1/2001 | D'Souza | 709/224 |
| 6,459,702 B1 | 10/2002 | Saaverda et al. | 370/422 |
| 6,463,079 B2 | 10/2002 | Sundaresan et al. | 370/468 |
| 6,614,781 B1 * | 9/2003 | Elliott et al. | 370/352 |
| 6,930,999 B1 * | 8/2005 | Craig et al. | 370/352 |
| 6,937,575 B1 * | 8/2005 | Galich et al. | 370/254 |
| 7,181,141 B1 * | 2/2007 | Kapur et al. | 398/58 |
| 7,512,114 B2 * | 3/2009 | Laturell | 370/352 |
| 7,907,969 B2 * | 3/2011 | Pulkkinen et al. | 455/560 |
| 2002/0044567 A1 | 4/2002 | Voit et al. | 370/467 |
| 2004/0120318 A1 * | 6/2004 | Clemm et al. | 370/395.2 |
| 2008/0242302 A1 * | 10/2008 | Pulkkinen et al. | 455/436 |
| 2009/0046655 A1 * | 2/2009 | Zhao et al. | 370/331 |
| 2009/0066788 A1 * | 3/2009 | Baum et al. | 348/143 |
| 2009/0070436 A1 * | 3/2009 | Dawes et al. | 709/219 |
| 2009/0070681 A1 * | 3/2009 | Dawes et al. | 715/736 |
| 2009/0132813 A1 * | 5/2009 | Schibuk | 713/158 |

(Continued)

FOREIGN PATENT DOCUMENTS

EP 798945 A2 * 10/1997

(Continued)

OTHER PUBLICATIONS

International Search Report in International Application No. PCT/US 03-35838, dated May 17, 2004, 6 pages.

(Continued)

*Primary Examiner* — Joseph T Phan
(74) *Attorney, Agent, or Firm* — Baker Botts L.L.P.

(57) ABSTRACT

A method includes receiving a request to provision a path associated with at least a portion of a packet network and determining whether a router is associated with the path in the packet network. The method also includes provisioning a first connection between a first gateway and a second gateway when the router is not associated with the path. The method further includes provisioning a second connection between the first gateway and the router and a third connection between the router and the second gateway when the router is associated with the path. In addition, the method includes at least one of associating and disassociating a first endpoint of the first gateway and a second endpoint of the second gateway with one or more of the connections.

17 Claims, 6 Drawing Sheets

U.S. PATENT DOCUMENTS

| | | | |
|---|---|---|---|
| 2010/0023865 A1* | 1/2010 | Fulker et al. | 715/734 |
| 2010/0199332 A1* | 8/2010 | Bachmann et al. | 726/4 |
| 2010/0205297 A1* | 8/2010 | Sarathy | 709/224 |
| 2010/0217837 A1* | 8/2010 | Ansari et al. | 709/218 |
| 2010/0245107 A1* | 9/2010 | Fulker et al. | 340/691.6 |
| 2011/0022652 A1* | 1/2011 | Lai et al. | 709/202 |
| 2011/0102171 A1* | 5/2011 | Raji et al. | 340/539.11 |
| 2011/0128378 A1* | 6/2011 | Raji | 348/143 |

FOREIGN PATENT DOCUMENTS

| | | |
|---|---|---|
| EP | 0 961 518 A2 | 12/1999 |
| EP | 961518 A2 * | 12/1999 |
| EP | 1 172 977 A1 | 1/2002 |
| EP | 1172977 A1 * | 1/2002 |
| WO | WO 00/31933 | 6/2000 |

OTHER PUBLICATIONS

James Reilly et al., "VPN management," Integrated Communications Management of Broadband Networks, The ICM Consortium, pp. 147-187, 1996.

Mauricio G.C. Resende et al., "A Grasp with Path-Relinking for Private Virtual Circuit Routing," AT&T Labs Research Technical Report, 19 pages, Jun. 15, 2001.

ESG-NetCOP, "Network Configuration, Optimization and Planning Tool," 12 pages, Printed Dec. 17, 2002.

Datasheet, "ATM Service Application—Service Applications for Cisco Provisioning Center (CPC)," 4 pages, 2001.

Office Action from the Canadian Intellectual Property Office; Application No. 2,507,214, Jan. 8, 2009.

Second Office Action received from the Patent Office of the People's Republic of China; Application No. 200380106519.8, Date of Decision May 20, 2009.

Office Action received from the Canadian Intellectual Property Office; Application No. 2,507,214; Sep. 30, 2009.

Communication pursuant to Article 94(3) EPC as issued by the EPO; Application No. 03 789 735.2-1249; Ref. P28022EP-PCT, Sep. 5, 2011.

* cited by examiner

SYSTEM AND METHOD FOR PROVISIONING CONNECTIONS AS A DISTRIBUTED DIGITAL CROSS-CONNECT OVER A PACKET NETWORK

TECHNICAL FIELD

This disclosure relates generally to communication systems, and more particularly to a system and method for provisioning a connection as a distributed digital cross-connect in a packet network.

BACKGROUND

A typical packet-based communication network can support communication sessions between two or more participants. For example, the network could support a voice telephone call by transporting Internet Protocol (IP) packets between a calling party and a called party. The packets containing the voice information are typically routed between the parties through various network nodes in the packet network.

SUMMARY

This disclosure describes a system and method for provisioning a connection as a distributed digital cross-connect in a packet network.

In one embodiment, a method includes receiving a request to provision a path associated with at least a portion of a packet network and determining whether a router is associated with the path in the packet network. The method also includes provisioning a first connection between a first gateway and a second gateway when the router is not associated with the path. The method further includes provisioning a second connection between the first gateway and the router and a third connection between the router and the second gateway when the router is associated with the path. In addition, the method includes at least one of associating and disassociating a first endpoint of the first gateway and a second endpoint of the second gateway with one or more of the connections.

In another embodiment, a method includes detecting an addition of a first gateway to a packet network. The method also includes establishing a first connection between the first gateway and a router when the first gateway is of at least one gateway type. In addition, the method includes identifying a second gateway and establishing a second connection between the first gateway and the second gateway when the first gateway is of at least one other gateway type.

One or more technical features may be present according to various embodiments of this disclosure. Particular embodiments of this disclosure may exhibit none, some, or all of the following features depending on the implementation. For example, in one embodiment, a system may establish a connection through a packet network. As particular examples, the system may establish a connection between an access gateway and a core gateway. The system could also establish a first connection between an access gateway and a router and a second connection between the router and a core gateway. The system may further associate endpoints at the access gateway and at the core gateway with the connection or connections. In addition, the system can pre-establish connections in the packet network when new gateways are added to the packet network. In this way, the system can establish connections through a packet network more easily. This may reduce the workload placed on a network administrator or other personnel responsible for maintaining the network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION OF EXAMPLE EMBODIMENTS

Figure 1:
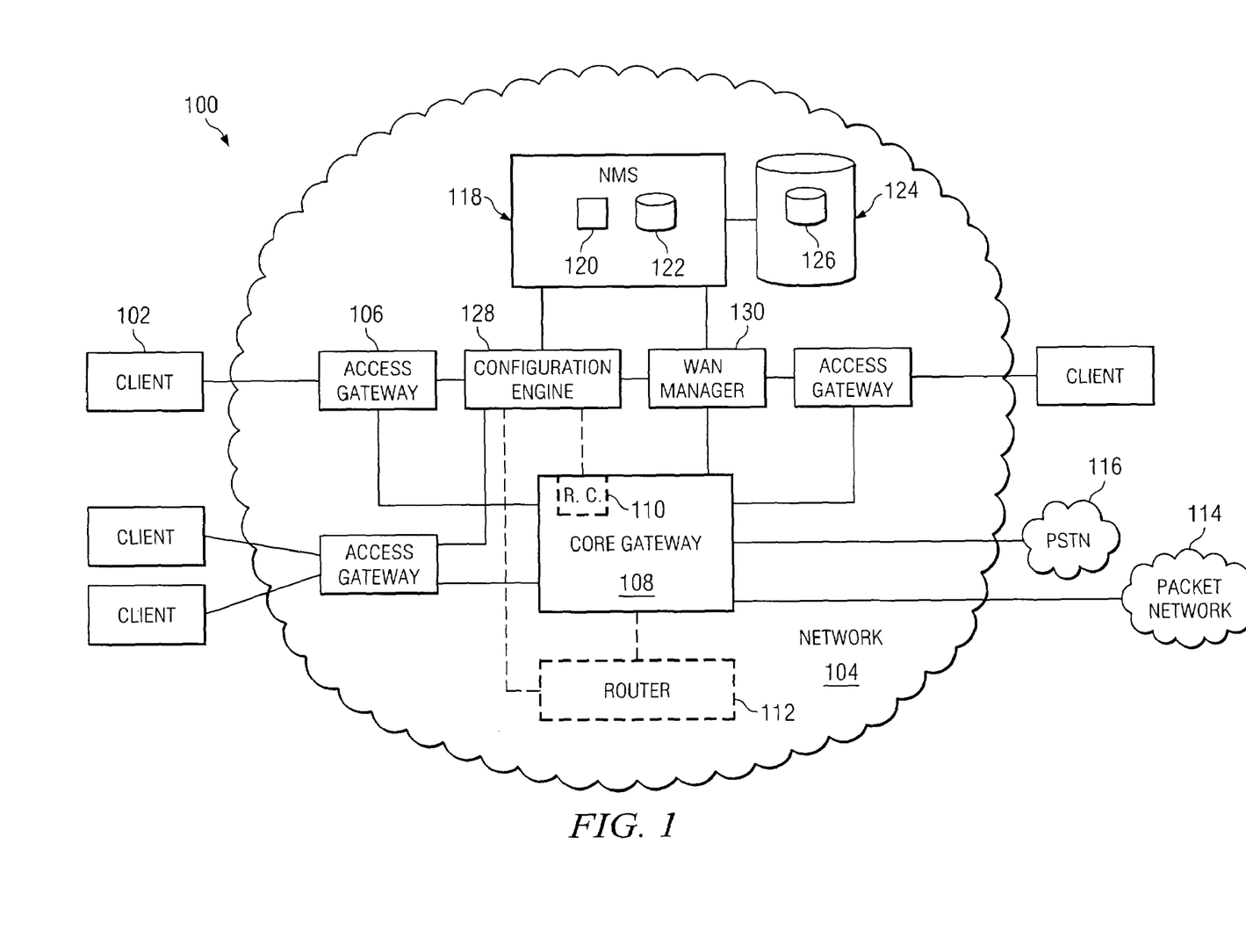
FIG. 1 illustrates an example communication system.

FIG. 1 illustrates an example communication system 100. In the illustrated embodiment, system 100 includes clients 102 and a packet network 104. Other embodiments of system 100 may be used without departing from the scope of this disclosure.

In one aspect of operation, a network management system (NMS) 118 manages the operation of network 104. In particular, network management system 118 manages paths, such as voice or data paths, through network 104 by provisioning connections between components of network 104. As particular examples, network management system 118 could establish connections between an access gateway 106 and a core gateway 108. Network management system 118 could also establish a first connection between an access gateway 106 and a router 110, 112 and a second connection between the router 110, 112 and a core gateway 108. Network management system 118 could further associate endpoints at both the access gateway 106 and at the core gateway 108 with the one or more connections, such as by associating ports of the gateways 106, 108 with the connection. In addition, network management system 118 may modify and/or disable the connection or connections in system 100. When disabling the connection or connections, network management system 118 may further tear down the connection or connections. In this way, network management system 118 can provision paths through network 104 with less interaction with a network administrator or other personnel, making it easier to establish the paths.

In the illustrated embodiment, clients 102 are coupled to network 104. In this document, the term "couple" refers to any direct or indirect physical, logical, virtual, or other types of communication between two or more components, whether or not those components are in physical contact with one another. Client 102 may include any communication device or devices for generating and/or processing voice or other data. For example, client 102 could represent a user device such as a wireline telephone, a wireless telephone, a personal computer, or a personal digital assistant. As particular examples, client 102 could represent a voice over packet client, such as a Voice over Internet Protocol (VoIP) client, a Session Initiation Protocol (SIP) client, or an International Telecommunication Union—Telecommunications (ITU-T) H.323 client. As another example, client 102 could represent network equipment, such as a wireless or cellular base station. Client 102 may include any hardware, software, firmware, or combination thereof for generating, storing, communicating, receiving, and/or processing voice or other data.

Network 104 facilitates communication between components coupled to network 104. For example, network 104 may communicate packets containing voice or other data between network addresses. In this document, the term "packet" refers to IP packets, frame relay frames, Asynchronous Transfer Mode (ATM) cells, or any other suitable segments of information. Network 104 may include one or more local area networks (LANs), metropolitan area networks (MANs), wide area networks (WANs), all or a portion of a global network such as the Internet, or any other communication system or systems at one or more locations. Network 104 may also operate according to any appropriate type of protocol or protocols, such as Ethernet, IP, X.25, frame relay, or any other packet data protocol. Network 104 may further support the conveyance of non-voice packets between clients 102 and/or other devices in system 100.

In the illustrated example, network 104 includes access gateways 106 and a core gateway 108. Access gateways 106 facilitate access to network 104 by clients 102. For example, access gateway 106 could receive information from multiple clients 102, packetize and compress the information, and communicate the packets to core gateway 108. Access gateway 106 may also receive packets over network 104, depacketize and decompress information in the packets, and communicate the information to clients 102. Access gateway 106 may include any hardware, software, firmware, or combination thereof for supporting the transport of voice and other information over network 104. Access gateway 106 may represent a switch, router, bridge, voice gateway, call manager, transceiver, hub, and/or any other type of device for conveying data packets. In one embodiment, access gateway 106 includes a number of ports for communicating with clients 102.

Core gateway 108 is coupled to access gateways 106. Core gateway 108 may facilitate the communication of voice and other information between one or more external networks, such as an external packet network 114 like the Internet and a public switched telephone network (PSTN) 116. For example, core gateway 108 could receive packets containing information from multiple access gateways 106, depacketize and/or decompress the information, and communicate the information to packet network 114 and/or PSTN 116. Core gateway 108 may also receive information from packet network 114 or PSTN 116, compress and/or packetize the information, and communicate the packets to one or more access gateways 106. Core gateway 108 may include any hardware, software, firmware, or combination thereof for supporting the transport of voice and other information over network 104. As particular examples, core gateway 108 may represent a switch such as an ATM or frame relay switch, a router, or a voice gateway. In one embodiment, core gateway 108 includes a number of ports for communicating with access gateways 106. Core gateway 108 may have a higher port density than access gateways 106. Core gateway 108 could also have a lower port density than access gateways 106.

In particular embodiments, core gateway 108 may include a router card 110 and/or network 104 may include a router 112. Router card 110 and router 112 may be generally referred to as routers 110, 112. Routers 110, 112 may be useful, for example, for routing IP packets between access gateways 106 and core gateway 108. Routers 110, 112 may each include any hardware, software, firmware, or combination thereof for routing packets. In other embodiments, routers 110, 112 need not be used in network 104.

A network management system 118 facilitates the management of network 104. For example, network management system 118 may establish a path such as a voice or data path through at least a portion of network 104, modify the path, or disable the path. Network management system 118 may include any hardware, software, firmware, or combination thereof for managing network 104. In the illustrated example, network management system 118 includes at least one processor 120 and at least one memory 122. Memory 122 could store instructions executed by processor 120 and data processed by processor 120.

In the illustrated embodiment, network management system 118 has access to a data store 124. Data store 124 stores and facilitates retrieval of information used by network management system 118. For example, data store 124 may store a network object model 126. Network object model 126 identifies the various components of network 104, such as access gateways 106, core gateway 108, and router 110. Network object model 126 may also store information identifying the various sub-components of the identified network components. For example, network object model 126 could identify the ports available for use in access gateways 106 and core gateway 108. Data store 124 could also store information identifying the various connections in system 100, such as by identifying the various paths provisioned in system 100. Data store 124 may include any hardware, software, firmware, or combination thereof operable to store and facilitate retrieval of information. Also, data store 124 may use any of a variety of data structures, arrangements, and compilations to store and facilitate retrieval of information.

To facilitate management of network 104 by network management system 118, a configuration engine 128 and a WAN manager 130 may be provided in network 104. Configuration engine 128 receives instructions from network management system 118, where the instructions involve the configuration of an access gateway 106 or a router card 110. Configuration engine 128 uses the instruction to configure the access gateway 106 or router card 110 as requested. Similarly, WAN manager 130 receives instructions from network management system 118, where the instructions involve the configuration of a core gateway 108. WAN manager 130 uses the instruction to configure the core gateway 108 as requested. In this way, management of network 104 can be distributed among multiple components of system 100. In another embodiment, management of network 104 can be centralized in a single component such as network management system 118, and the functions of configuration engine 128 and WAN manager 130 could be incorporated into network management system 118.

In one aspect of operation, network management system 118 may receive a request to provision a path in at least a portion of network 104. Network management system 118 may then provision one or more circuits or other connections between at least one access gateway 106, at least one core gateway 108, and/or at least one router 110, 112. As particular examples, network management system 118 may provision a permanent virtual circuit between an access gateway 106 and core gateway 108. Network management system 118 may also provision a first layer 2 permanent virtual circuit and a layer 3 route between an access gateway 106 and a router 110 and a second layer 2 permanent virtual circuit and a layer 3 route between the router 110 and core gateway 108. The phrases "layer 2" and "layer 3" refer to various layers in the Open System Interconnection (OSI) networking framework. Network management system 118 may further associate endpoints, such as ports, of the access gateway 106 and the core gateway 108 with the permanent virtual circuit or circuits. In this way, network management system 118 can establish paths in system 100 as digital cross-connects, where network management system 118 cross-connects two endpoints to create a path. Network management system 118 can create, modify, or disable the cross-connects without requiring a network administrator or other personnel to know the specifics of how the paths are provisioned. Although network management system 118 may be described in this document as provisioning a path between an access gateway 106 and a core gateway 108, network management system 118 may provision any suitable path, such as a path between two access gateways 106 through core gateway 108.

In a particular embodiment, network management system 118 uses object model 126 to identify which components of network 104 to use in provisioning a path through network 104. In this particular embodiment, network management system 118 also uses object model 126 to issue instructions to configuration engine 128 and WAN manager 130. These instructions cause configuration engine 128 and WAN manager 130 to provision circuits through network 104 and to associate ports in access gateway 106 and core gateway 108 with the provisioned circuits.

In another aspect of operation, network management system 118 can pre-establish connections in network 104 when new gateways 106, 108 are added to network 104. For example, when a new core gateway 108 is added to network 104, network management system 118 could establish a permanent virtual circuit between the new core gateway 108 and a router 110, 112. When a new access gateway 106 is added to network 104, network management system 118 could identify the core gateway 108 that serves the new access gateway 106. Network management system 118 may then establish a permanent virtual circuit between the new access gateway 106 and the identified core gateway 108. In this way, future requests to establish paths involving the new gateways 106, 108 may be completed more quickly.

Although FIG. 1 illustrates one example of a communication system 100, various changes may be made to FIG. 1. For example, the network 104 in FIG. 1 is for illustration only. Networks having other or additional components in other arrangements could be used in system 100. As a particular example, network 104 could include multiple core gateways 108 that are "daisy-chained" together, such as where two core gateways 108 communicate over packet network 114. Also, network 104 could include any number of access gateways 106 and core gateways 108. Further, while FIG. 1 illustrates core gateway 108 communicating with both packet network 114 and PSTN 116, core gateway 108 could communicate with only one of these networks and/or additional networks. In addition, while network 104 is shown as including a WAN manager 130, network 104 could include any other suitable type of manager.

Figure 2:
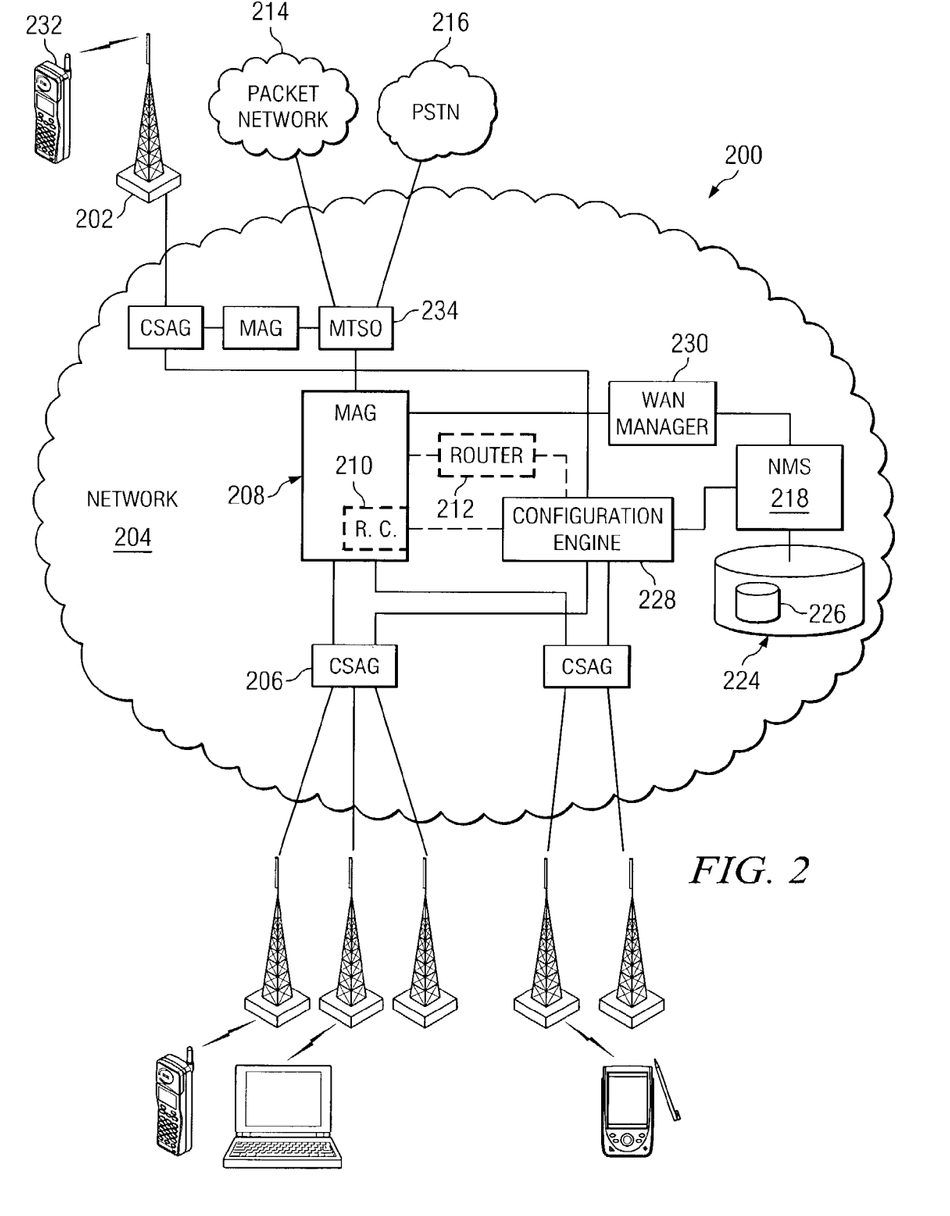
FIG. 2 illustrates another example communication system.

FIG. 2 illustrates another example communication system 200. In the illustrated embodiment, system 200 includes base stations 202 and a packet network 204. Other embodiments of system 200 may be used without departing from the scope of this disclosure.

In the illustrated example, base station 202 communicates with one or more wireless devices 232. Wireless device 232 may include any suitable communication device operable to communicate over a wireless interface. Wireless devices 232 may include, for example, wireless telephones, portable computers, and personal digital assistants. Base station 202 may include any hardware, software, firmware, or combination thereof for communicating with one or more wireless devices 232. Base station 232 could, for example, include one or more transmitters, receivers, and/or transceivers.

Figure 3:
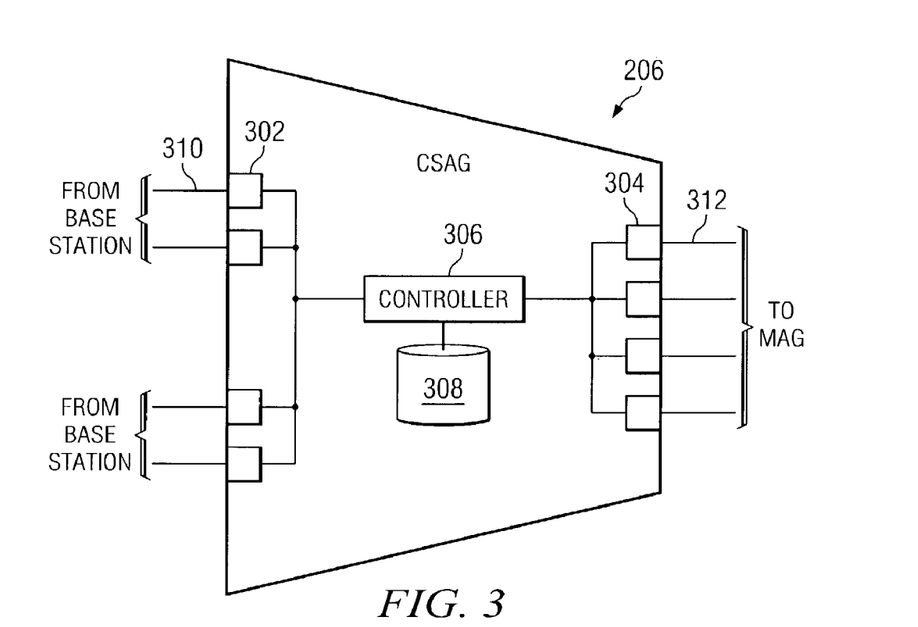
FIG. 3 illustrates an example access gateway in a communication system.

Cell site access gateways (CSAGs) 206 are coupled to a base station 202 and to a mobile telephony switching office access gateway (MAG) 208. CSAG 206 acts as an access gateway to provide access to network 204 for base station 202. For example, CSAG 206 could receive voice and other traffic from base station 202, packetize the traffic, and communicate the traffic to MAG 208. CSAG 206 could also receive packets containing traffic from MAG 208, depacketize the traffic, and communicate the traffic to base station 202. In one embodiment, CSAG 206 is co-located with a base station 202 in system 200. In particular embodiments, CSAG 206 could use one or more voice codecs to compress and decompress voice information, such as the ITU-T G.726, G.729a, and G.729b codecs. One example of a CSAG 206 is shown in FIG. 3, which is described below.

Figure 4:
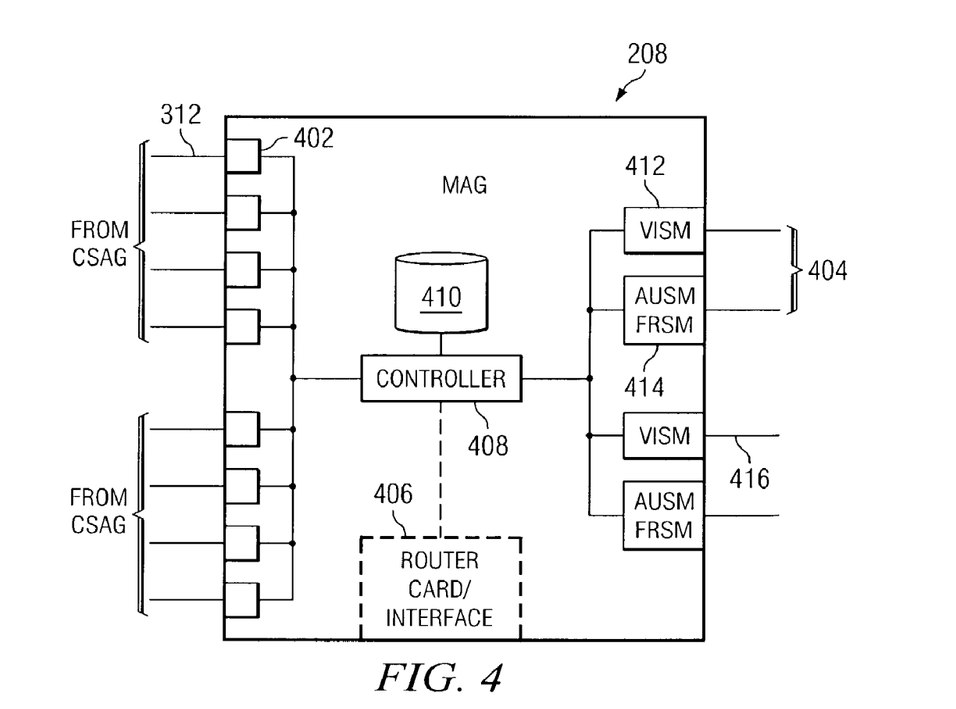
FIG. 4 illustrates an example core gateway in a communication system.

MAG 208 is coupled to CSAG 206 and to mobile telephony switching office (MTSO) equipment 234. MTSO 234 provides access to one or more external networks, such as packet network 214 and PSTN 216. MTSO 234 could, for example, include a class 4 or class 5 switch for handling voice traffic and/or a frame relay switch and an ATM switch for handling data traffic. MAG 208 acts as a core gateway in network 204 by facilitating access to other CSAGs 206 and to the external networks through MTSO 234. For example, MAG 208 could receive traffic from one or more CSAGs 206. MAG 208 may also separate voice traffic and data traffic, route the data traffic to the frame relay switch or ATM switch of MTSO 234, and route the voice traffic to the class 4 switch or class 5 switch of MTSO 234. MAG 208 could further route traffic between CSAGs 206. One example of a MAG 208 is shown in FIG. 4, which is described below. In particular embodiments, MAG 208 could use one or more voice codecs to process voice information coming from and/or going to PSTN 216, such as the ITU-T G.726, G.729a, and G.729b codecs.

One or more router cards 210 and/or routers 212, referred to collectively as routers 210, 212, could be used in network 204. Routers 210, 212 could, for example, route IP packets in system 100. In other embodiments, routers 210, 212 need not be used in network 204.

A network management system 218 facilitates the management of network 204. For example, network management system 218 may provision a path in at least a portion of network 204. Network management system 218 could have access to a data store 224, which may store a network object model 226 used to provision the paths in network 204. A configuration engine 228 and a WAN manager 230 may facilitate management of CSAGs 206, MAGs 208, and routers 210, 212 in network 204.

In one aspect of operation, network management system 218 receives a request to provision a path in at least a portion of network 204. Network management system 218 provisions one or more permanent virtual circuits in network 204. If a router 210 needs to participate in the path, a first layer 2 permanent virtual circuit and a layer 3 route are provisioned between a CSAG 206 and a router 210. A second layer 2 permanent virtual circuit and layer 3 route are provisioned between the router 210 and MAG 208. If no router 210, 212 is needed, a permanent virtual circuit can be provisioned between a CSAG 206 and a MAG 208. Network management system 218 may also associate endpoints at CSAG 206 and MAG 208 with the one or more permanent virtual circuits. The endpoints could, for example, represent a port in CSAG 206 used by a particular base station 202 and a port in MAG 208 used to communicate with MTSO 234.

In another aspect of operation, network management system 218 pre-establishes connections in network 204 when a new CSAG 206 or MAG 208 is added to network 204. For example, when a new MAG 208 is added to network 204, network management system 218 could establish a permanent virtual circuit between the new MAG 208 and a router 210, 212. When a new CSAG 206 is added to network 204, network management system 218 could establish a permanent virtual circuit between the new CSAG 206 and a MAG 208. These permanent virtual circuits can then be used to establish the paths in network 204.

Although FIG. 2 illustrates another example of a communication system 200, various changes may be made to FIG. 2. For example, networks 204 having other or additional components in other arrangements could be used in system 200. Also, network 204 could include any number of CSAGs 206 and MAGs 208. Further, while FIG. 2 illustrates MTSO 234 communicating with both packet network 214 and PSTN 216, MTSO 234 could communicate with only one of these networks and/or additional networks. Beyond that, while network 204 is shown as including a WAN manager 230, network 204 could include any other suitable type of manager. In addition, FIGS. 1 and 2 illustrate two possible operational environments for the functionality described with respect to network management systems 118, 218. The same or similar functionality could also be used in any other operational environment.

FIG. 3 illustrates an example access gateway in a communication system. In particular, FIG. 3 illustrates an example CSAG 206 of FIG. 2. In the illustrated embodiment, CSAG 206 includes base station ports 302, MAG ports 304, a controller 306, and a memory 308.

Base station ports 302 transmit and receive voice and data traffic to and from base stations 202. Base station ports 302 may, for example, communicate with base stations 202 over links 310, which may represent any suitable links coupling CSAG 206 and base stations 202. Links 310 could, for example, represent T1 lines supporting multiple DS0s. In a particular embodiment, base station ports 302 may receive Time Division Multiple Access (TDMA) 1G traffic, TDMA 2G traffic, Global System for Mobile communication (GSM) traffic, Cellular Digital Packet Data (CDPD) traffic, Universal Mobile Telecommunications System (UMTS) traffic, and clear channel traffic. The clear channel traffic could incorporate any of the other types of traffic. Base station port 302 may include any suitable structure or structures for facilitating communication with a base station 202.

MAG ports 304 facilitate communication with one or more MAGs 208 in network 204. For example, MAG ports 304 may transmit and receive voice and data traffic over one or more permanent virtual circuits 312. In one embodiment, MAG ports 304 may transmit and receive voice and data traffic over one or more ATM Adaptation Layer—2 (AAL2) permanent virtual circuits 312 and/or one or more ATM Adaptation Layer—5 (AAL5) permanent virtual circuits 312. In a particular embodiment, TDMA 1G, TDMA 2G, and GSM traffic is sent over AAL2 or AAL5 permanent virtual circuits 312, and CDPD and UMTS traffic is sent over AAL5 permanent virtual circuits 312. MAG port 304 may include any suitable structure or structures for facilitating communication with a MAG 304.

Controller 306 is coupled to base station ports 302 and MAG ports 304. Controller 306 facilitates communication between base station ports 302 and MAG ports 304, which helps to facilitate communication between base stations 202 and MAGs 208. For example, controller 306 may receive voice and data traffic over base station ports 302, packetize the traffic, and communicate the packets to MAG ports 304. Controller 306 could also receive traffic in packets from MAG ports 304, depacketize the traffic, and communicate the traffic to base station ports 302. Controller 306 could further consolidate traffic from base station 202, such as by compressing voice traffic using one or more codecs. In addition, controller 306 can associate a base station port 302 with a MAG port 304, such that traffic is exchanged between the base station port 302 and the MAG port 304. In this way, controller 306 cross-connects a base station port 302 and a MAG port 304. Controller 306 could represent any suitable processing device or devices, such as one or more digital signal processors (DSPs).

Memory 308 is coupled to controller 306. Memory 308 may store and facilitate retrieval of information used by controller 306. For example, memory 308 may store information identifying a mapping or cross-connect between a base station port 302 and a MAG port 304. Memory 308 may include any suitable volatile or non-volatile storage and retrieval device or devices.

Although FIG. 3 illustrates one example of an access gateway in a communication system, various changes may be made to FIG. 3. For example, CSAG 206 has been simplified for ease of illustration and explanation and may include other or additional components. Also, CSAG 206 could include any suitable number of ports 302, 304. In addition, other embodiments of an access gateway can be used in systems 100, 200 without departing from the scope of this disclosure.

FIG. 4 illustrates an example core gateway in a communication system. In particular, FIG. 4 illustrates an example MAG 208 of FIG. 2. In the illustrated embodiment, MAG 208 includes CSAG station ports 402, MTSO ports 404, a router card/interface 406, a controller 408, and a memory 410.

CSAG ports 402 transmit and receive voice and data traffic to and from CSAGs 206. CSAG ports 402 may, for example, transmit and receive packets containing voice and data traffic coming from or going to base stations 202. CSAG ports 402 may communicate with CSAGs 206 using one or more permanent virtual circuits 312, such as AAL2 and/or AAL5 permanent virtual circuits. CSAG port 402 may include any suitable structure or structures for facilitating communication with a CSAG 206.

MTSO ports 404 transmit and receive voice and data traffic to and from MTSO 234. For example, MTSO ports 404 could include voice interworking service modules (VISMs) 412 that facilitate communication with a class 4 switch, a class 5 switch, or other voice equipment in MTSO 234. MTSO ports 404 could also include frame relay service modules (FRSM)/ATM universal service modules (AUSM) 414 that facilitate communication with a frame relay switch, an ATM switch, or other data equipment in MTSO 234. In one embodiment, MTSO ports 404 communicate with MTSO 234 using one or more links 416, such as one or more T1 lines supporting multiple DS0 s. MTSO port 404 may include any suitable structure or structures for facilitating communication with MTSO 234.

Router card/interface 406 represents a router card 210 and/or an interface to an external router 212. Router card/interface 406 allows traffic to be transported between CSAG 206 and MAG 208 using IP packets. In this embodiment, router card/interface 406 and/or the external router 212 terminates the permanent virtual circuit 312 used to transport the IP packets, and router card/interface 406 and/or the external router 212 routes the IP packets to the appropriate MTSO port 404.

Controller 408 is coupled to CSAG ports 402, MTSO ports 404, and router card/interface 406. Controller 408 facilitates communication between CSAG ports 402, MTSO ports 404, and router card/interface 406, which helps to facilitate communication between CSAGs 206 and MTSO 234. For example, controller 408 may receive packets containing voice and data traffic over CSAG ports 402, depacketize the traffic, send the voice traffic to VISMs 412, and send the data traffic to AUSM/FRSM 414. Controller 408 could also associate one or more CSAG ports 402 with one or more MTSO ports 404, thereby cross-connecting the CSAG ports 402 and the MTSO ports 404. Controller 408 could further associate one or more CSAG ports 402 with router card/interface 406 and associate router card/interface 406 with one or more MTSO ports 404, thereby cross-connecting the CSAG ports 402 and the MTSO ports 404 through router card/interface 406. Controller 408 could represent any suitable processing device or devices, such as one or more DSPs.

Memory 410 is coupled to controller 408. Memory 410 may store and facilitate retrieval of information used by controller 408. For example, memory 410 may store information identifying a mapping between CSAG ports 402, MTSO ports 404, and/or router card/interface 406. Memory 410 may include any suitable volatile or non-volatile storage and retrieval device or devices.

Although FIG. 4 illustrates one example of a core gateway in a communication system, various changes may be made to FIG. 4. For example, MAG 208 has been simplified for ease of illustration and explanation and may include other or additional components. Also, MAG 208 could include any suitable number of ports 402, 404. In addition, other embodiments of a core gateway can be used in systems 100, 200 without departing from the scope of this disclosure.

Figure 5:
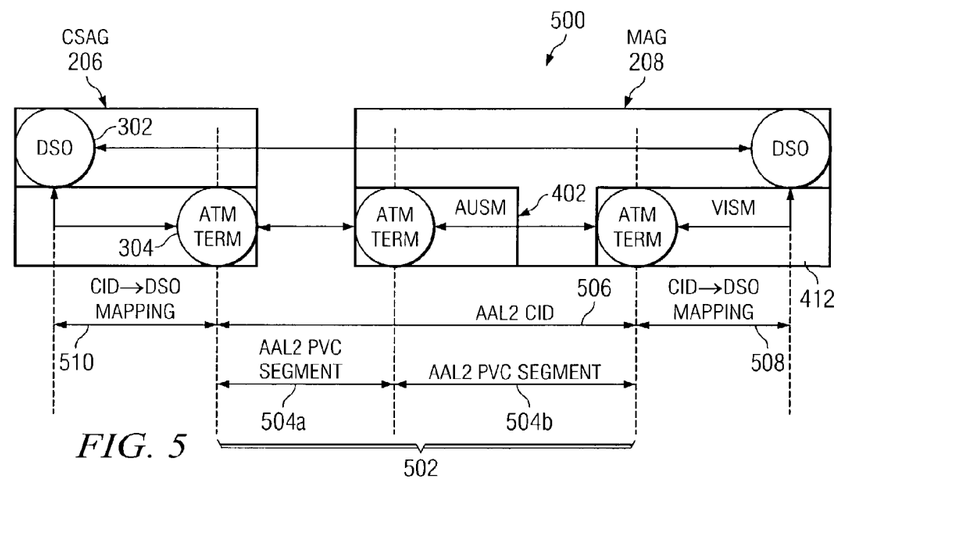
FIG. 5 illustrates one example of the connections created to support a path in a communication system.

FIG. 5 illustrates one example of the connections 500 created to support a path in a communication system. In particular, FIG. 5 illustrates the connections 500 created to establish a path between a CSAG 206 and a MAG 208 using an AAL2 permanent virtual circuit. While the following description describes network management system 218 establishing a path in network 204, the same paths may be involved when a path is modified or disabled in network 204. Also, the functions attributed to network management system 218 could be performed in a distributed manner by network management system 218, configuration engine 228, WAN manager 230, MAG 208, and/or CSAG 206.

In one embodiment, network management system 218 may provision a path in network 204 between CSAG 206 and MAG 208 in response to a user request. For example, a user may identify a source gateway, such as a CSAG 206, and a target gateway, such as a MAG 208. The user may also identify the endpoints to be used, such as one or more ports 302 of CSAG 206 and one or more ports 404 of MAG 208. In one embodiment, the ports 302, 404 available for use could be displayed to the user, allowing the user to select which ports to use. In a particular embodiment, ports 302, 404 may be able to support only a subset of the services available to the user, such as when a base station 202 connected to a particular port 302 can only support certain voice codecs. In this particular embodiment, the ports 302, 404 displayed to the user as being available for use could be limited to ports that support the service requested by the user.

In response to the request, network management system 218 determines whether an AAL2 permanent virtual circuit 502 exists between the source CSAG 206 and the target MAG 208. The permanent virtual circuit 502 could have been established previously when the CSAG 206 and/or MAG 208 was added to network 204. If not, network management system 218 creates the AAL2 permanent virtual circuit 502. As shown in FIG. 5, AAL2 permanent virtual circuit 502 includes two segments 504a and 504b. One segment 504a lies between the termination of ATM at a MAG port 304 of CSAG 206 and the termination of ATM at a CSAG port 402 of MAG 208. Another segment 504b lies between the termination of ATM at the CSAG port 402 of MAG 208 and the termination of ATM at a VISM 412 of MAG 208.

A channel identifier (CID) 506 is established on top of the AAL2 permanent virtual circuit 502. As examples, a user may supply or network management system 218 may generate a CID value for the permanent virtual circuit 502. In one embodiment, network management system 218 uses a TDM endpoint number, such as a number associated with VISM 412, to generate the CID value. In another embodiment, network management system 218 could add an offset to the TDM endpoint number and use the result to generate the CID value. In a particular embodiment, the TDM endpoint number used by network management system 218 is associated with the gateway 206, 208 having the higher port density. The CID value is then mapped to a DS0 of VISM 412, which is represented as mapping 508. The same CID value is also mapped to a DS0 of a base station port 202, which is represented as mapping 510. This establishes a cross-connect between the DS0 of base station port 202 and the DS0 of VISM 412.

Although FIG. 5 illustrates one example of the connections 500 created to support a path in a communication system, various changes may be made to FIG. 5. For example, FIG. 5 illustrates one of many possible examples of the connections that can be used to establish a path in a communication system. Any other suitable connections can be used in systems 100, 200.

Figure 6:
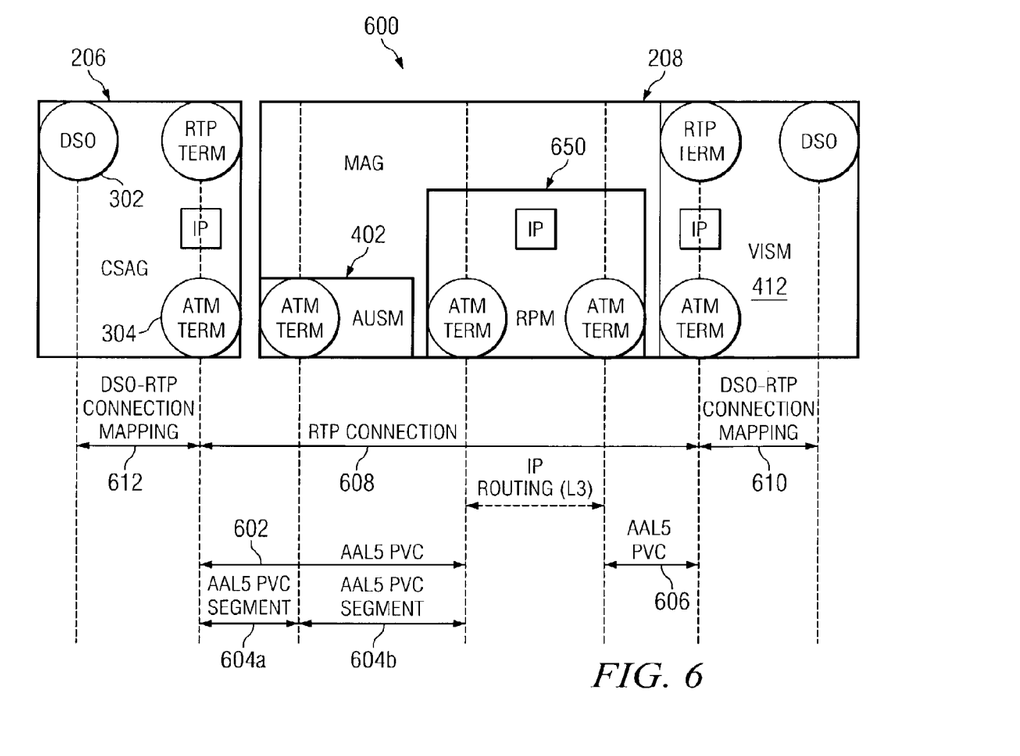
FIG. 6 illustrates another example of the connections created to support a path in a communication system.

FIG. 6 illustrates another example of the connections 600 created to support a path in a communication system. In particular, FIG. 6 illustrates the connections 600 created to establish a path between a CSAG 206 and a MAG 208 using AAL5 permanent virtual circuits. While the following description describes network management system 218 establishing a path in network 204, the same paths may be involved when a path is modified or disabled in network 204. Also, the functions attributed to network management system 218 could be performed in a distributed manner by network management system 218, configuration engine 228, WAN manager 230, MAG 208, and/or CSAG 206.

To establish the path, network management system 218 determines whether an AAL5 permanent virtual circuit 602 exists between the CSAG 206 and a router card 650 of MAG 208. Router card 650 could correspond to router card 210 of FIG. 2. The permanent virtual circuit 602 could have been established previously when the CSAG 206 and/or MAG 208 was added to network 204. If not, network management system 218 creates the AAL5 permanent virtual circuit 602. The AAL5 permanent virtual circuit 602 includes two segments 604a and 604b. One segment 604a lies between the termination of ATM at a MAG port 304 of CSAG 206 and the termination of ATM at a CSAG port 402 of MAG 208. Another segment 604b lies between the termination of ATM at the CSAG port 402 of MAG 208 and the termination of ATM at the router card 650 of MAG 208.

In a particular embodiment, the AAL5 permanent virtual circuit 602 carries traffic between CSAG 206 and MAG 208 in IP packets for all of the DS0s established at CSAG 206. In this way, only one AAL5 permanent virtual circuit 602 needs to be established between CSAG 206 and MAG 208. Router card 650 strips the IP packets from the ATM/AAL5 transmission medium, inspects the IP packets, and routes the IP packets to one or more VISMs 412 over one or more second AAL5 permanent virtual circuits 606. In a particular embodiment, one second AAL5 permanent virtual circuit 606 is established between router card 650 and each VISM 412.

In one embodiment, traffic is transported over the AAL5 permanent virtual circuits 602, 606 using a Realtime Transfer Protocol (RTP) connection 608. The DS0s in the CSAG 206 and MAG 208 are associated with the RTP connection 608 using RTP port numbers. In one embodiment, network management system 218 generates an RTP port number for each VISM 412. In a particular embodiment, network management system 218 uses a TDM endpoint number and adds an offset value to the endpoint number. The resulting RTP port value is used to associate a VISM 412 with the RTP connection 608 (shown as mapping 610), thereby associating the VISM 412 with AAL5 permanent virtual circuits 602, 606. In a similar manner, the same RTP port value is used to associate a DS0 of a base station port 302 with the RTP connection 608 (shown as mapping 612), thereby associating the base station port 302 with AAL5 permanent virtual circuits 602, 606. Information arriving over a particular RTP port in CSAG 206 is transported to MAG 208 at output over the associated VISM 412 in MAG 208. Similarly, information arriving over a particular RTP port in MAG 208 is transported to CSAG 206 at output over the associated base station port 202 in CSAG 206.

Although FIG. 6 illustrates another example of the connections 600 created to support a path in a communication system, various changes may be made to FIG. 6. For example, FIG. 6 illustrates another of many possible examples of the connections that can be used to establish a path in a communication system. Any other suitable connections can be used. Also, while FIG. 6 illustrates the use of a MAG 208 with a router card 650, the same or similar connections can be used when an external router, such as router 212, is used.

Figure 7:
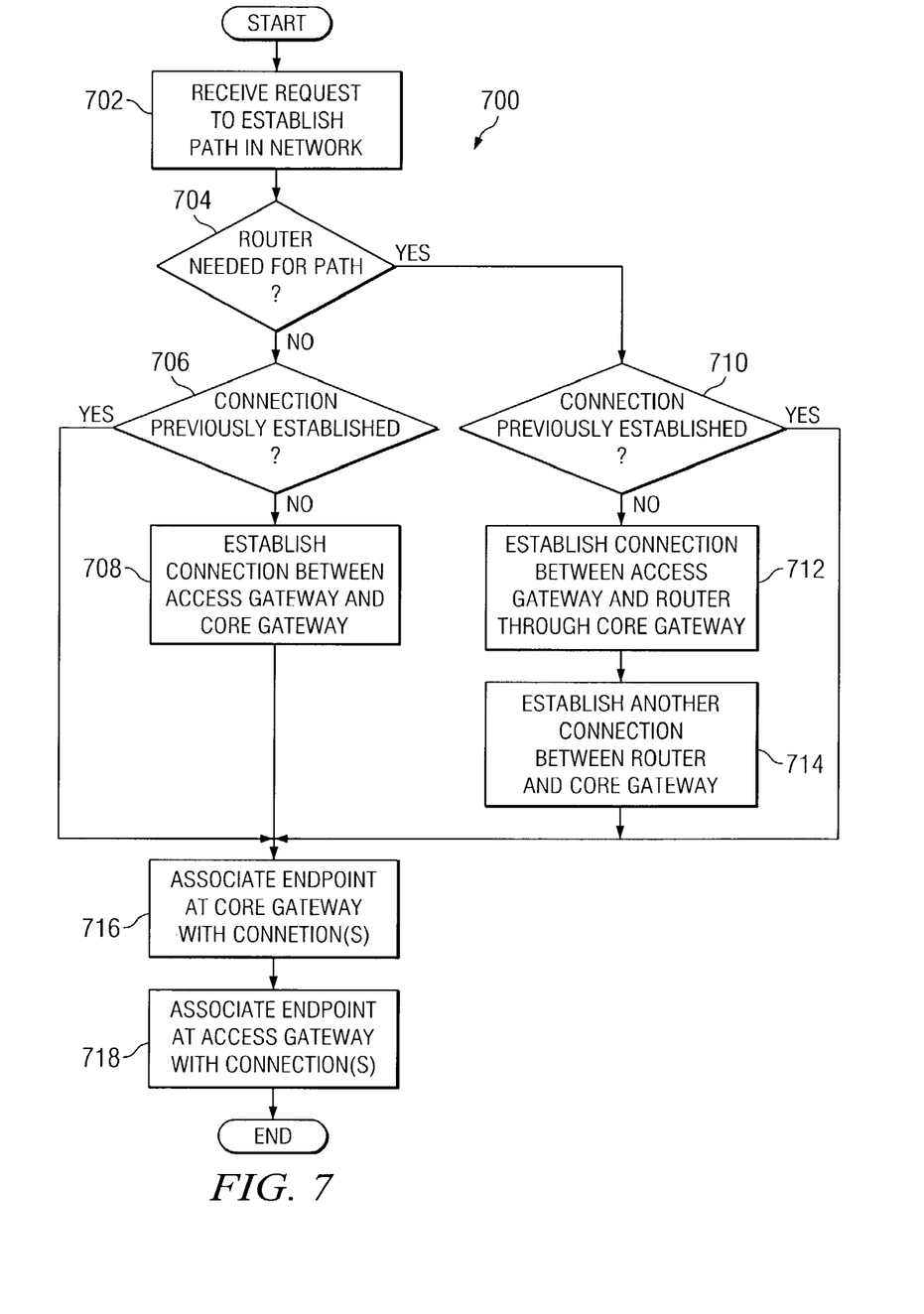
FIG. 7 illustrates an example method for establishing a path in a communication system.

FIG. 7 illustrates an example method 700 for provisioning a path in a communication system. While method 700 may be described with respect to system 100 of FIG. 1 or system 200 of FIG. 2, method 700 could also be used by any other system. Also, while method 700 may be described as establishing a path in system 100 or system 200, the same or similar method could be used to modify or disable a path. In addition, while FIG. 7 is described with respect to a network management system 118, 218, the steps illustrated in method 700 could be distributed among and executed by network management system 118, 218, configuration engine 128, 228, WAN manager 130, 230, core gateway 108 or MAG 208, and/or access gateway 106 or CSAG 206.

A network management system receives a request to establish a path in a network at step 702. This may include, for example, a user submitting a request to network management system 118, 218. The request may include the identity of a source gateway, such as access gateway 106 or CSAG 206. The request may also include the identity of a target gateway, such as core gateway 108 or MAG 208. The request may further identify the endpoints for the path, such as one or more base station ports 302 of CSAG 206 and one or more MTSO ports 404 of MAG 208. In addition, the request could identify the type of service requested, such as TDMA 1G, TDMA 2G, GSM, CDPD, and UMTS services.

The network management system determines whether the path requires the use of a router at step 704. This may include, for example, network management system 118, 218 determining whether an AAL2 or an AAL5 permanent virtual circuit is needed for the path. The type of permanent virtual circuit may depend, for example, on the type of service requested at step 702. As particular examples, TDMA 1G, TDMA 2G, and GSM services may use AAL2 or AAL5 permanent virtual circuits, and CDPD and UMTS traffic may use AAL5 permanent virtual circuits. In this example, AAL2 permanent virtual circuits may not require the use of a router, while AAL5 permanent virtual circuits may require the use of a router.

If no router is needed, the network management system determines whether a suitable connection has previously been established at step 706. This may include, for example, network management system 118, 218 determining whether an AAL2 permanent virtual circuit exists between the access gateway and the core gateway. If a connection does not exist, the network management system establishes a connection between the access gateway and the core gateway at step 708. This may include, for example, network management system 118, 218 establishing an AAL2 permanent virtual circuit between access gateway 106 or CSAG 206 and core gateway 108 or MAG 208. This may also include network management system 118, 218 establishing two AAL2 segments 504.

If a router is needed, the network management system again determines whether a suitable connection has previously been established at step 710. This may include, for example, network management system 118, 218 determining whether two AAL5 permanent virtual circuits exist between the access gateway, a router, and the core gateway. If not, the network management system establishes a first connection between the access gateway and a router at step 712. This may include, for example, network management system 118, 218 establishing an AAL5 permanent virtual circuit between access gateway 106 or CSAG 206 and router card 110, 210 or router 112, 212. This may also include network management system 118, 218 establishing two AAL5 segments 604. The network management system establishes a second connection between the router and the core gateway at step 714. This may include, for example, network management system 118, 218 establishing an AAL5 permanent virtual circuit between router card 110, 210 or router 112, 212 and core gateway 108 or MAG 208. This may also include network management system 118, 218 establishing a route that associates RTP terminations on the access gateway 106 or CSAG 206 with RTP terminations of the core gateway 108 or MAG 208.

The network management system associates an endpoint at the core gateway with the connection or connections at step 716. This may include, for example, network management system 118, 218 generating a CID value or an RTP port value. This may also include the core gateway using the CID value or RTP port value to associate a port of the core gateway, such as a MTSO port 404 of MAG 208, with the established permanent virtual circuit or circuits.

The network management system associates an endpoint at the access gateway with the connection or connections at step 718. This may include, for example, the access gateway using the same CID value or the same RTP port value to associate a port of the access gateway, such as a base station port 302 of CSAG 206, with the established permanent virtual circuit or circuits.

At this point, the port of the access gateway and the port of the core gateway have an established path between them. Voice traffic can then pass between the ports and travel over network 104, 204. A user need not have specific knowledge of how the path was established.

Although FIG. 7 illustrates one example of a method 700 for establishing a path in a communication system, various changes may be made to FIG. 7. For example, while method 700 describes associating the endpoint at the core gateway before associating the endpoint at the access gateway, the endpoint at the access gateway could be associated first. This may occur, for example, when the access gateway has a higher port density than the core gateway. Also, the same method could be used to modify or disable a path. For example, to modify or disable a path, the network management system could modify or tear down connections at steps 708, 712, 714 and disassociate the endpoints with the connections at steps 716, 718.

Figure 8:
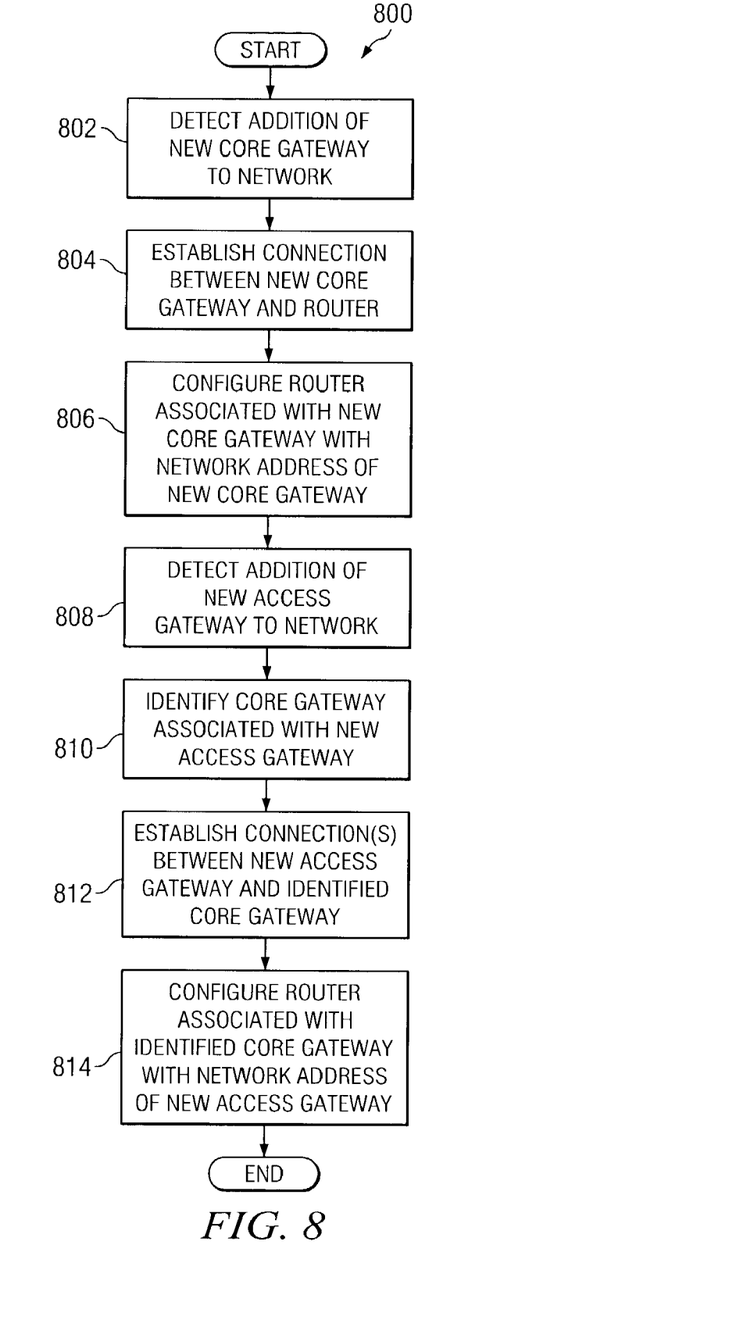
FIG. 8 illustrates an example method for pre-establishing connections in a communication system.

FIG. 8 illustrates an example method 800 for pre-establishing connections in a communication system. While method 800 may be described with respect to system 100 of FIG. 1 or system 200 of FIG. 2, method 800 could also be used by any other system. Also, while FIG. 8 is described with respect to network management system 118, 218, the steps illustrated in method 800 could be distributed among and executed by network management system 118, 218, configuration engine 128, 228, WAN manager 130, 230, core gateway 108 or MAG 208, and/or access gateway 106 or CSAG 206.

A network management system detects the addition of a new core gateway in a network at step 802. This may include, for example, a user informing network management system 118, 218 of the presence of a new core gateway 108 or MAG 208. This may also include the new core gateway 108 or MAG 208 announcing itself when installed in network 104, 204 and network management system 118, 218 detecting the announcement. The network management system 118, 218 may then communicate with the new gateway to retrieve information and generate an object representing the new gateway in object model 126, 226.

The network management system establishes a connection between the new core gateway and a router at step 804. This may include, for example, network management system 118, 218 establishing an AAL5 permanent virtual circuit between a router and the new core gateway 108 or MAG 208. The network management system configures the router associated with the new core gateway with a route to the network address of the new core gateway at step 806. This may include, for example, network management system 118, 218 updating router 112, 212 of the network address associated with the new core gateway 108 or MAG 208. In this way, router 112, 212 and the new core gateway can communicate and exchange IP packets.

The network management system detects the addition of a new access gateway in the network at step 808. This may include, for example, a user informing network management system 118, 218 of the presence of a new access gateway 106 or CSAG 206 or the new access gateway announcing its presence.

The network management system identifies a core gateway associated with the new access gateway at step 810. This may include, for example, a user identifying the core gateway 108 or MAG 208 to be used with the new access gateway. The network management system establishes one or more connections between the new access gateway and the identified core gateway at step 812. This may include, for example, network management system 118, 218 establishing one or more AAL2 and/or AAL5 permanent virtual circuits between the new access gateway 106 or CSAG 206 and the identified core gateway. The network management system configures a router associated with the identified core gateway with a route to the network address of the new access gateway at step 814. The router may be the same router updated at step 806 or a different router. This may include, for example, network management system 118, 218 updating the router with a route to the network address associated with the new access gateway 106 or CSAG 206. In this way, the router can communicate with and exchange packets with the new access gateway.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    detecting, at a network device, an addition of a first gateway to a packet network;
    determining whether the first gateway comprises an access gateway or a core gateway;
    if the first gateway comprises a core gateway:
        establishing a first connection between the first gateway and a router; and
        generating an object representing the first gateway; and
    if the first gateway comprises an access gateway:
        identifying a second gateway; and
        establishing a second connection between the first gateway and the second gateway;
        associating a first endpoint of the first gateway with one or more of the connections;
        associating a second endpoint of the second gateway with one or more of the connections; and
        associating the first and second endpoints with one or more of the connections by generating a channel identifier, the first gateway operable to map the channel identifier to a first Digital Signal level 0 (DS0) connection at the first gateway, and the second gateway operable to map the channel identifier to a second DS0 connection at the second gateway.

2. The method of claim 1, further comprising receiving an identity of the second gateway from a user.

3. The method of claim 1, wherein the connections comprise at least one of layer 2 permanent virtual circuits and layer 3 routes.

4. The method of claim 1, wherein the router comprises one of a router coupled to the second gateway and a router in the second gateway; and
    further comprising configuring the router with a route to a network address of the first gateway.

5. At least one tangible and non-transitory computer readable storage medium encoded with logic that is operable when executed to:
    detect an addition of a first gateway to a packet network;
    determine whether the first gateway comprises an access gateway or a core gateway;
    if the first gateway comprises a core gateway:
        establish a first connection between the first gateway and a router; and
        generate an object representing the first gateway; and
    if the first gateway comprises an access gateway:
        identify a second gateway; and
        establish a second connection between the first gateway and the second gateway;
        associate a first endpoint of the first gateway with one or more of the connections;
        associate a second endpoint of the second gateway with one or more of the connections; and
        associate the first and second endpoints with one or more of the connections by generating a channel identifier, the first gateway operable to map the channel identifier to a first Digital Signal level 0 (DS0) connection at the first gateway, and the second gateway operable to map the channel identifier to a second DS0 connection at the second gateway.

6. The computer readable storage medium of claim 5, wherein the logic is further operable to identify the second gateway by receiving an identity of the second gateway from a user.

7. The computer readable storage medium of claim 5, wherein:
the router comprises one of a router coupled to the second gateway and a router in the second gateway; and
the logic is further operable to configure the router with a route to a network address of the first gateway.

8. A system, comprising:
one or more processors collectively operable to:
detect an addition of a first gateway to a packet network;
determine whether the first gateway comprises an access gateway or a core gateway;
if the first gateway comprises a core gateway:
establish a first connection between the first gateway and router; and
generate an object representing the first gateway; and
if the first gateway comprises an access gateway:
identify a second gateway; and
establish a second connection between the first gateway and the second gateway;
associate a first endpoint of the first gateway with one or more of the connections;
associate a second endpoint of the second gateway with one or more of the connections; and
associate the first and second endpoints with one or more of the connections by generating a channel identifier, the first gateway operable to map the channel identifier to a first Digital Signal level 0 (DS0) connection at the first gateway, and the second gateway operable to map the channel identifier to a second DS0 connection at the second gateway; and
a memory operable to store an object model, the object model identifying the first and the second gateways.

9. The system of claim 8, wherein the one or more processors are further collectively operable to identify the second gateway by receiving an identity of the second gateway from a user.

10. The system of claim 8, wherein:
the router comprises one of a router coupled to the second gateway and a router in the second gateway; and
the one or more processors are further collectively operable to configure the router with a route to a network address of the first gateway.

11. A system, comprising:
a memory operable to store an object model, the object model identifying a plurality of gateways in a packet network; and
one or more processors collectively operable to:
detect an addition of a first gateway to a packet network;
establish a first connection between the first gateway and a router when the first gateway is of at least one gateway type;
identify a second gateway and establish a second connection between the first gateway and the second gateway when the first gateway is of at least one other gateway type;
receive a request to establish a path through at least a portion of the packet network;
determine whether the router is required by a type of virtual circuit used by the requested wireless communication service;
establish a third connection between the router and the second gateway when the router is required in the path;
associate a first endpoint of the first gateway with one or more of the connections;
associate a second endpoint of the second gateway with one or more of the connections; and
associate the first and second endpoints with one or more of the connections by generating a channel identifier, the first gateway operable to map the channel identifier to a first Digital Signal level 0 (DS0) connection at the first gateway, and the second gateway operable to map the channel identifier to a second DS0 connection at the second gateway.

12. The system of claim 11, wherein the one or more processors are collectively operable to determine whether the router is required by identifying one of a plurality of connection types associated with the path, at least one of the connection types involving the router and at least one other of the connection types not involving the router.

13. The system of claim 11, wherein the one or more processors are collectively operable to:
determine whether the first connection has been previously established; and
establish the first connection when the first connection has not been previously established.

14. The system of claim 11, wherein the one or more processors are collectively operable to associate the first and second endpoints with one or more of the connections by generating one of a channel identifier or a Realtime Transfer Protocol (RTP) port value, the first gateway operable to map the channel identifier or RTP port value to the first Digital Signal level 0 (DS0) connection at the first gateway, and the second gateway operable to map the channel identifier or RTP port value to the second DS0 connection at the second gateway.

15. The system of claim 11, wherein the router comprises one of a router card in the second gateway and an external router.

16. The system of claim 11, wherein the object model also identifies one or more of the connections.

17. The system of claim 11, wherein the one or more processors are collectively operable to:
disable the one or more connections; and
tear down the one or more connections.

* * * * *